US006851304B2

(12) United States Patent
Cullen et al.

(10) Patent No.: US 6,851,304 B2
(45) Date of Patent: Feb. 8, 2005

(54) AIR ESTIMATION APPROACH FOR INTERNAL COMBUSTION ENGINE CONTROL

(75) Inventors: Michael J. Cullen, Northville, MI (US); Giuseppe D. Suffredini, Shelby Township, MI (US); Paul A. Pietrzyk, Beverly Hills, MI (US); Jeffrey A. Doering, Canton, MI (US); Aaron Schweizerhof, Farmington, MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 10/352,804

(22) Filed: Jan. 28, 2003

(65) Prior Publication Data

US 2004/0144166 A1 Jul. 29, 2004

(51) Int. Cl.[7] .............................................. G01M 19/00
(52) U.S. Cl. ..................................................... 73/118.2
(58) Field of Search ........................... 73/112, 115, 116, 73/117.2, 118.1, 118.2; 701/29

(56) References Cited

U.S. PATENT DOCUMENTS

| | | | | |
|---|---|---|---|---|
| 5,331,936 A | | 7/1994 | Messih et al. | |
| 5,497,329 A | * | 3/1996 | Tang | 701/104 |
| 5,555,870 A | * | 9/1996 | Asano | 123/480 |
| 5,889,205 A | * | 3/1999 | Treinies et al. | 73/118.2 |
| 6,089,082 A | | 7/2000 | Kotwicki et al. | |
| 6,115,664 A | | 9/2000 | Cullen et al. | |
| 6,138,504 A | | 10/2000 | Lewis et al. | |
| 6,155,242 A | | 12/2000 | Kotwicki et al. | |
| 6,182,644 B1 | | 2/2001 | Kotwicki et al. | |
| 6,234,012 B1 | | 5/2001 | Lewis et al. | |
| 6,282,485 B1 | | 8/2001 | Kotwicki et al. | |
| 6,460,409 B1 | * | 10/2002 | Soliman et al. | 73/118.2 |
| 6,640,622 B2 | * | 11/2003 | Soliman et al. | 73/118.2 |
| 6,718,822 B2 | * | 4/2004 | Soliman et al. | 73/118.2 |
| 2002/0179050 A1 | * | 12/2002 | Soliman et al. | 123/399 |
| 2003/0046991 A1 | * | 3/2003 | Masson et al. | 73/118.2 |
| 2004/0024517 A1 | * | 2/2004 | Jankovic et al. | 701/102 |

* cited by examiner

*Primary Examiner*—Eric S. McCall
(74) *Attorney, Agent, or Firm*—Allan J. Lippa

(57) ABSTRACT

A method is described for estimating cylinder charge using either the throttle position or mass air flow sensor. The method saves calibration and development expenses by using the same manifold filling model approach regardless of which sensor, or combination of sensors, is used.

9 Claims, 7 Drawing Sheets

AIR ESTIMATION APPROACH FOR INTERNAL COMBUSTION ENGINE CONTROL

FIELD OF THE INVENTION

The field of the present invention relates generally to estimating an amount of air in cylinders of an internal combustion engine based on sensory data.

BACKGROUND OF THE INVENTION

Determining an amount of air entering an engine, and in particular and amount of air in cylinders of the engine, is important for various aspects of engine control. For example, the fuel control and fuel delivery are typically coordinated based on a determination of air entering the engine to maintain a desired air to fuel ratio (air-fuel ratio).

It is known to use a lookup table of steady-state engine airflow versus engine speed and throttle to estimate engine airflow. This known estimate also used additional table adjustments for EGR, IMRC and VCT. Electronic throttle control system applications added a manifold filling model to these steady-state tables.

In some cases, the present inventors have recognized that it can be desirable to generate duplicate estimates of engine airflow. In some cases, these duplicate estimates can be generated from independent sensory information, or from common sensory information.

One disadvantage recognized by the present inventors relates to the manifold filling process. In particular, manifold filling refers to the filling/emptying dynamics of air storage in the intake manifold of the engine. In other words, airflow entering the manifold is not necessarily the same as the airflow exiting the manifold (entering the cylinders) due to the manifold volume. When duplicate estimates of air in the engine are generated using differing models (as differing sensor inputs are sometimes utilized), calculation errors between the duplicate estimates can be experienced.

SUMMARY OF THE INVENTION

The above disadvantages are overcome by:

a method for estimating air entering an internal combustion engine having an intake manifold, comprising:

determining a first estimate of air entering the manifold of the engine based on throttle position;

determining a second estimate of air entering the manifold of the engine based on a sensor coupled to the engine;

processing said first estimate through a manifold filling model to produce a first estimate of air entering a cylinder of the engine;

processing said second estimate through said manifold filling model to produce a second estimate of air entering a cylinder of the engine; and adjusting an engine operating parameter based on at least one of said first and second estimates.

By using the same manifold filling model, better consistency between the two estimates can be obtained with less calibration effort.

An advantage over prior technology is lower calibration effort, lower ROM requirements, and higher accuracy especially in transient operation. In particular, the similarity of the calculations to the mass air path results in better agreement between the two estimates.

DETAILED DESCRIPTION

Figure 1:
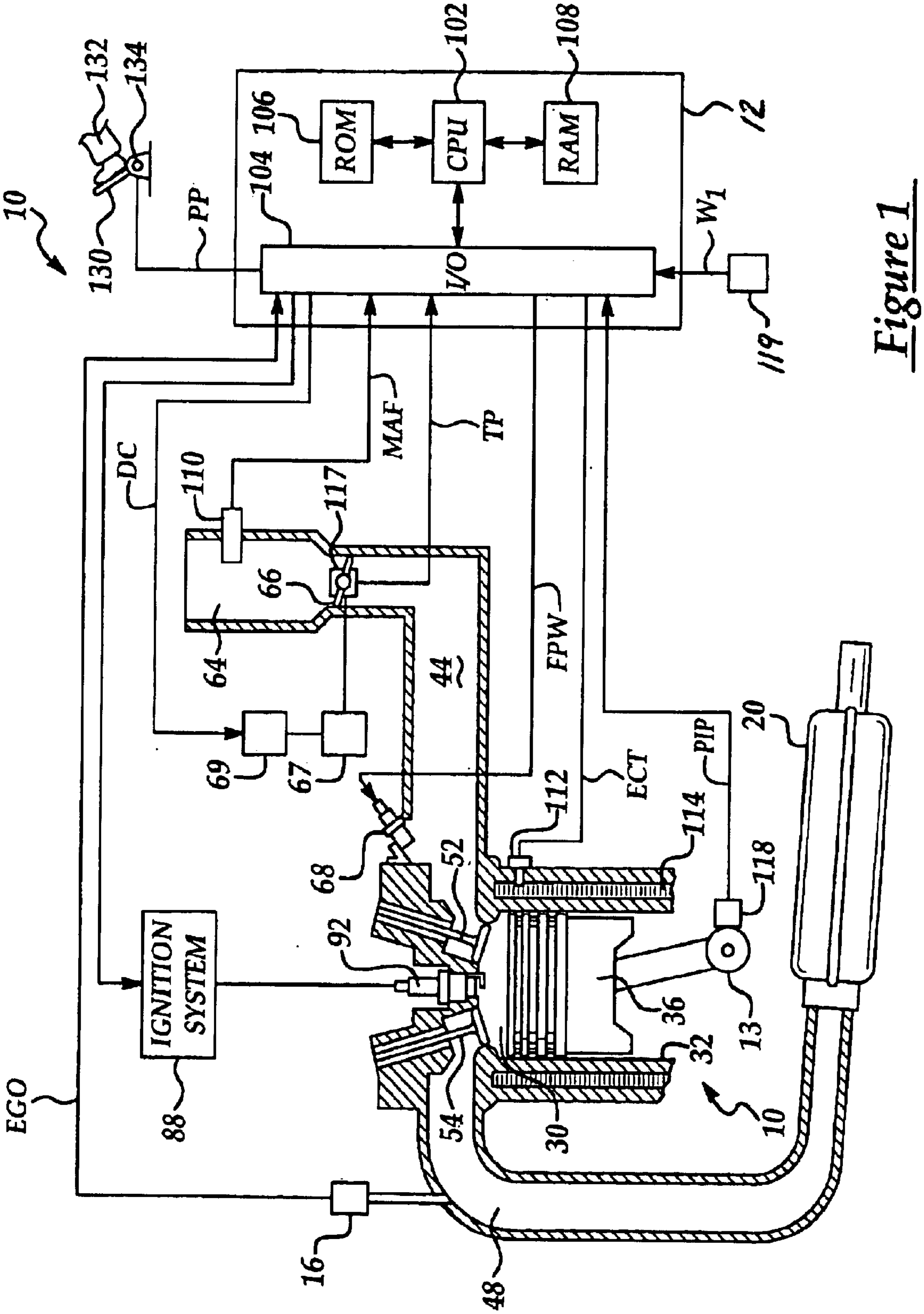
FIG. 1 is a block diagram of an engine for use with various embodiments of the present invention.

Internal combustion engine 10 comprises a plurality of cylinders, one cylinder of which is shown in FIG. 1. Electronic engine controller 12 controls Engine 10. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TED from throttle position sensor 117 coupled to throttle plate 66; a measurement of turbine speed (Wt) from turbine speed sensor 119, where turbine speed measures the speed of shaft 13; and a profile ignition pickup signal (PIP) from Hall effect sensor 118 coupled to crankshaft 13 indicating and engine speed (N).

Figure 2:
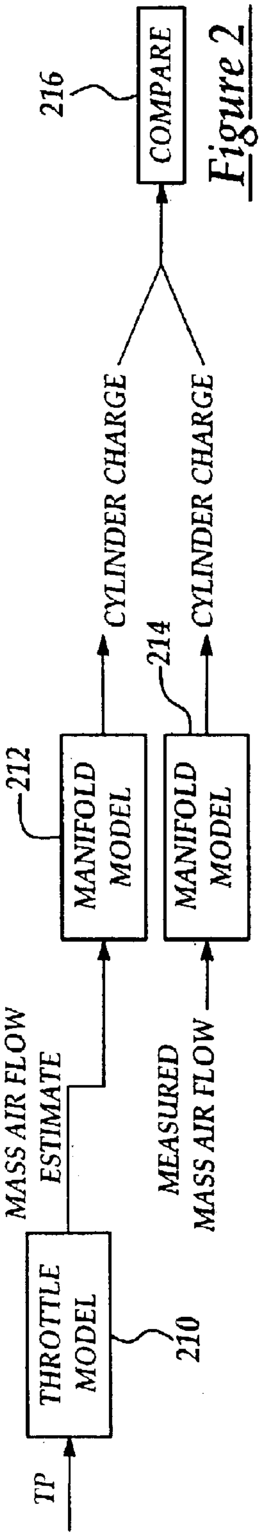
FIGS. 2 and 2A are schematic representations of the methodology of various aspects of the present invention.

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 66. In this alternative embodiment, the air bypass valve (not shown) receives a control signal (not shown) from controller 12.

FIG. 2 shows a schematic representation of one embodiment of the present invention. In particular, the routine shows that throttle position data is fed to block 210, which represents the throttle model. From the throttle position (and other operating conditions of the vehicle and engine) the routine estimates mass air flow. This is fed to block 212, which represents the manifold filling model. This model accounts for the dynamics of the manifold volume on engine airflows. From this model, an estimate of cylinder charge is calculated.

In addition to using throttle position, an estimate of cylinder air charge can be determined using the mass air flow sensor 110 (and other operating conditions of the vehicle and engine). According to one aspect of the present invention, it is possible to use the same model in block 214 as was used in block 212. From the two estimates of cylinder charge, a comparison can be made in block 216. The comparison can merge the two values to form a more accurate value to fuel the engine. Alternatively, the routine can use one estimate in place of the other if one of the throttle position sensor or mass air flow sensor has degraded.

Figure 2A:
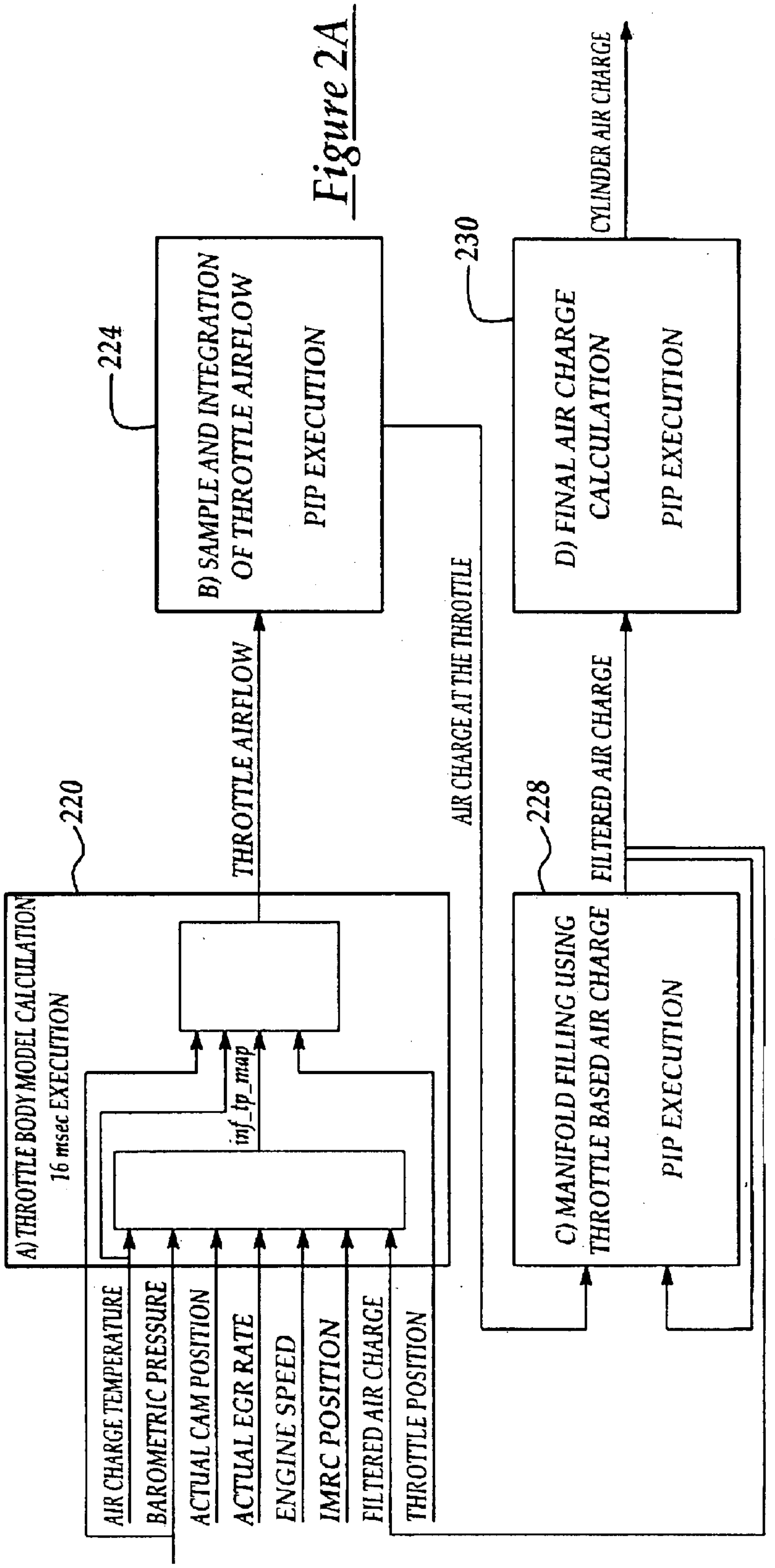

FIG. 2A describes this approach in more detail. IN particular, the throttle body model is illustrated as block 220 using data from the throttle position sensor, engine speed, barometric pressure, and inferred manifold pressure.

The calculated throttle airflow is fed to block 224, which samples the data at PIP rate (synchronous with engine firing). The sampled data is fed to the manifold filling model in block 228, along with the manifold filter coefficient. Block 228 produces the filtered air charge, inferred manifold pressure, and an inferred vacuum level. These are fed to block 230, which calculates the final air charge at PIP rate. The details will be described more fully below.

One embodiment of the present invention estimates the mass airflow into an engine based on a throttle position, engine speed, air charge temperature, engine coolant temperature and barometric pressure. The algorithm has potential uses in low cost engines where a mass air meter can be deleted to save cost. This could be done in conjunction with a barometric pressure sensor, using a fixed value of BP in countries where it does not vary much (e.g., Australia), or using a inferred barometric pressure algorithm.

It is useful to have an accurate calculation of air mass inducted per intake stroke in an internal combustion engine based on throttle position. This can either be a sole estimate in low cost cars, where neither a MAP (manifold absolute pressure) sensor or mass air flow (MAF) sensor is used, or it can be a redundant calculation in addition to one based on MAP or MAF. The redundant estimate can be used for default operation, as a substitute for a MAF in a region of high engine pulsations (where MAF sensor output can be degraded), or as a redundant or duplicate estimate in systems.

Figure 3:
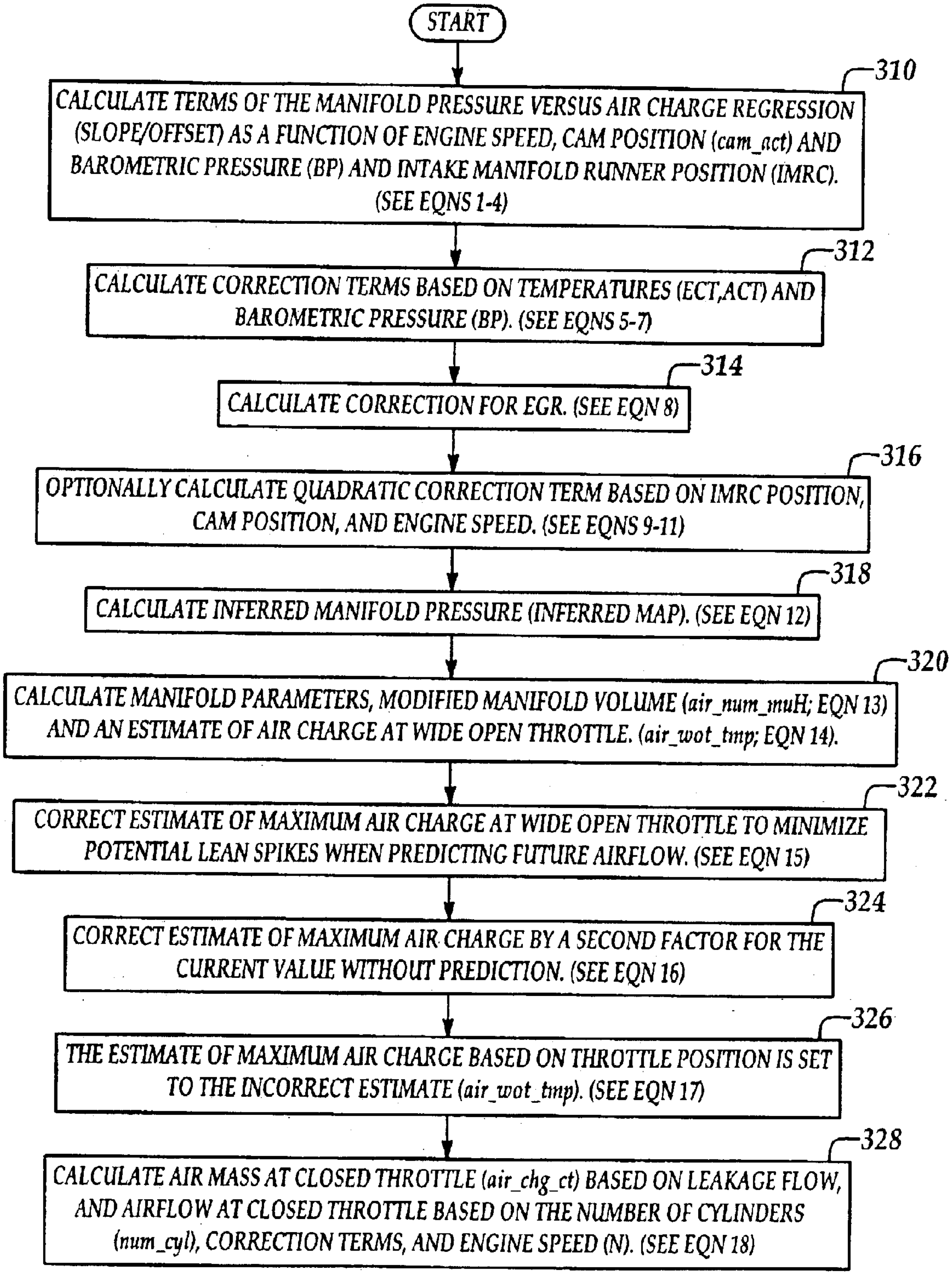
FIGS. 3–8 are high level flowcharts illustrating various embodiments of the present invention.

Referring now to FIG. 3, a routine for performing various calculations is described. In one embodiment, the routine performs the calculations at a 0.1 second rate. The following equations calculate the terms of the manifold pressure versus air charge regression. This basic regression of manifold pressure versus engine speed and air charge is revealed in U.S. Pat. No. 6,115,664, the entire contents of which are incorporated herein by reference.

First, the intercept of the regression is calculated in step 310 according to equation 1. Note that the intercept is independent of IMRC (intake manifold runner control position).

*map*__regr__intercept=lookup(FNAIROFFSET, engine__speed, cam__act)*bp/29.92; EQN 1.

The slope is calculated as a function of imrc (IMRC position) and cam timing in equations 2–3. Specifically, the slope term with the IMRC open is calculated in equation 2, and the slope term with the IMRC closed is calculated in equation 3.

map__regr__slope__imrc__open=lookup(FNAIRSLOPE__O, engine__speed, cam__act); EQN 2 map__regr__slope__imrc__closed=lookup(FNAIRSLOPE__C, engine__speed, cam__act); EQN 3 where, imrc__pct__opt is a RAM register representing the imrc position with 1 indicating open. Although the imrc is a two position device, provision is made for a continuous device. Or, a slow device with an inference of position versus time during the transition. Equation 4 implements this approach:

map__regr__slope=imrc__pct__act*map__regr__slope__imrc__open+(1.0−imrc__pct__act)*map__regr__slope__imrc__closed; EQN 4

The calculations can optionally augment the slop-offset estimation of engine breathing using a quadratic term, as described in equations 9–11 below. (see step 316).

map__regr__quad__term__imrc__open=lookup(FNAIRQUAD__O, engine__speed, cam__act); EQN 9 (Quadratic term when IMRC open.)

map__regr__quad__term__imrc__closed=lookup(FNAIRQUAD__C, engine__speed, cam__act); EQN 10 (Quadratic term when IMRC open.)

map__regr__quad__term=imrc__pct__act*map__regr__quad__term__imrc__open+(1.0−imrc__pct__act)*map__regr__quad__term__imrc__closed; EQN 11

Besides the intercept, slope, and quadratic terms, there are several additional terms in the inferred map formula, as described below.

The first term to be described is air__vol__eff__den__corr. This is suitable from estimating the air charge at a manifold pressure when the act and ect vary from standard mapping conditions at which the base calibration values are developed.

The 100 Deg.F. below is the standard air charge temperature (act) where the baseline calibration of map versus air charge was developed and stored in ROM tables FNAIRSLOPE__O, FNAIRSLOPE__C, FNAIRQUAD__O, FNAIRQUAD__C. When the measured act deviates from this value the calibration data is adjusted. The first adjustment is the ratio of temperature in degrees Rankin. This is traceable to the classic pv=mRt formula for the mass at a given pressure and temperature.

The second temperature effect, captured in FN1052, reflects the fact that between the time the act is measured, usually above the throttle plate, and the time it enters the cylinder, heat is added to the air stream by the intake manifold and combustion chamber walls, whose temperature is related to engine coolant temperature.

The following equations 5 and 6 include these factors:

air__vol__eff__corr__tmp=lookup(FN1052, act, ect); EQN 5 air__vol__eff__den__corr=((100+460)/(act+460))*air__vol__eff__cor__tmp; EQN 6

An additional factor gives the total translation from an air charge at a given engine speed and throttle, at a standard temperature of 100 Deg.F. act, 200 Deg.F. ect, and 29.92 In.Hg. BP, to the air charge at WOT at the current act and bp (barometric pressure) as shown in equation 7.

air__adj__fact=(560/(act+460))*air__vol__eff__cor__tmp*bp/29.92); EQN 7

These corrections are performed in step 312 of FIG. 3.

Next, in step 314, a correction for EGR is included. The effect of EGR is to increase the manifold pressure with inert gas at a given mass air flow. The MAPPEREGR constant reflects the fact that the EGR is hotter, and if an air charge temperature sensor is used instead of a manifold charge temperature sensor the temperature effect will not be captured. The empirical value, typically 1.25, captures this increase in MAP. Equation 8, below, shows the details of the EGR correction using the temporary value of the cylinder air charge (cyl__air__chg__tmp):

air__map__x=cyl__air__chg__tmp*(1.0+MAPPEREGR*egr__rate__act/100.0)/air__vol__eff__den__corr; EQN 8

Note that cyl__air__chg__tmp is the same as air__chg__tmp, defined recursively by equation 31.

To avoid certain problems with a conventional quadratic polynomial fit, the 'orthogonal polynomial' method was used to make the quadratic term independent of the linear slope and intercept terms. Thus carryover calibrations could be used with the quadratic term set to zero or the quad term could be added for increased accuracy without changing the linear term. Thus, in one embodiment, the quadratic term is utilized, while in another it is set to zero.

Note also that Maxairchg__tmp equals SARCHG in most cases, which is 0.0027 times displacement in liters per cylinder.

Next, in step 318, the inferred manifold pressure is calculated according to equation 12.

inferred__map=map__regr__intercept+map__regr__slope*air__map__x+map__regr__quad__term*(air__map__x^2−maxairchg__tmp*air__map__x+(maxairchg__tmp^2)/6.0); EQN 12

Next, in step 320, manifold parameters are calculated according to equations 13 and 14. These parameters are used in the calculation of the filter coefficient of the manifold filling model. Also note that AIR__MAN__VOL is the manifold volume in liters.

air__num__mult=(11961.7/AIR__MAN__VOL)*air__vol__eff__corr__tmp; EQN 13

The following value is the estimate of the aircharge at wide open throttle. It is developed by inverting the map vs air charge regression to have map as an input, and setting the map input to barometric pressure minus a small calibratable delta AIR__TPDELBP, usually equal to 0.3. An alternate embodiment would make AIR__TPDELBP a function of engine speed. The variable is then adjusted to current act, ect and bp conditions.

air__wot__tmp=(((29.92−AIR__TPDELBP)−map__regr__intercept)/map__regr__slope)*air__adj__fact; EQN 14

The next step (322, EQN 15) corrects the estimate of maximum air charge at wide open throttle to minimize potential lean spikes when predicting future airflows. In other words, the value is multiplied by a calibratable factor ARCANTCOR, (typical value 1.15), to reflect the fact that anticipation logic is an estimate in the future, and it is best to error on high side so a lean A/F spike does not result because this may cause degradation of engine components.

air__wot__ant=air__wot__tmp*ARCANTCOR; EQN 15

Next, in step 324, the estimate of maximum aircharge is corrected by a second factor for the current value of airflow without prediction as shown in equation 16. I.e., a different safety factor ARCWOTCOR is applied, typical value 1.1, because it is used in the current estimate and the uncertainty is less.

air__chg__wot=air__wot__tmp*ARCWOTCOR; EQN 16

Next, in step 326, the estimate of maximum aircharge based on throttle position is set to the uncorrected estimate (air__wot__tmp) as shown in equation 17. I.e., the clip on air charge based on tp has safety factor applied.

air__chgwottp=air__wot__tmp; EQN 17

Finally, in step 328, the routine calculates the air mass at closed throttle (air__chg__ct). The air mass at closed pedal consists of leakages around the throttle body and the airflow at closed throttle position. This is converted to an air charge and adjusted by a calibratable safety factor ARCCTCOR, usually=1.1, as shown in equation 18.

air__chg__ct=(etc__leakages+air__tb__0 tpam*air__adj__fact)/(n*numcyl__0/2.0)*air__vol__eff__den__corr*ARCCTCOR; EQN 18

Note, in an alternative embodiment, the computations for temperature effects and WOT terms are implemented as indicated at 100 ms. However, the computations for slope, offset, quadratic, and inferred manifold pressure terms (including the look-up tables) are done at 16 ms.

Figure 4:
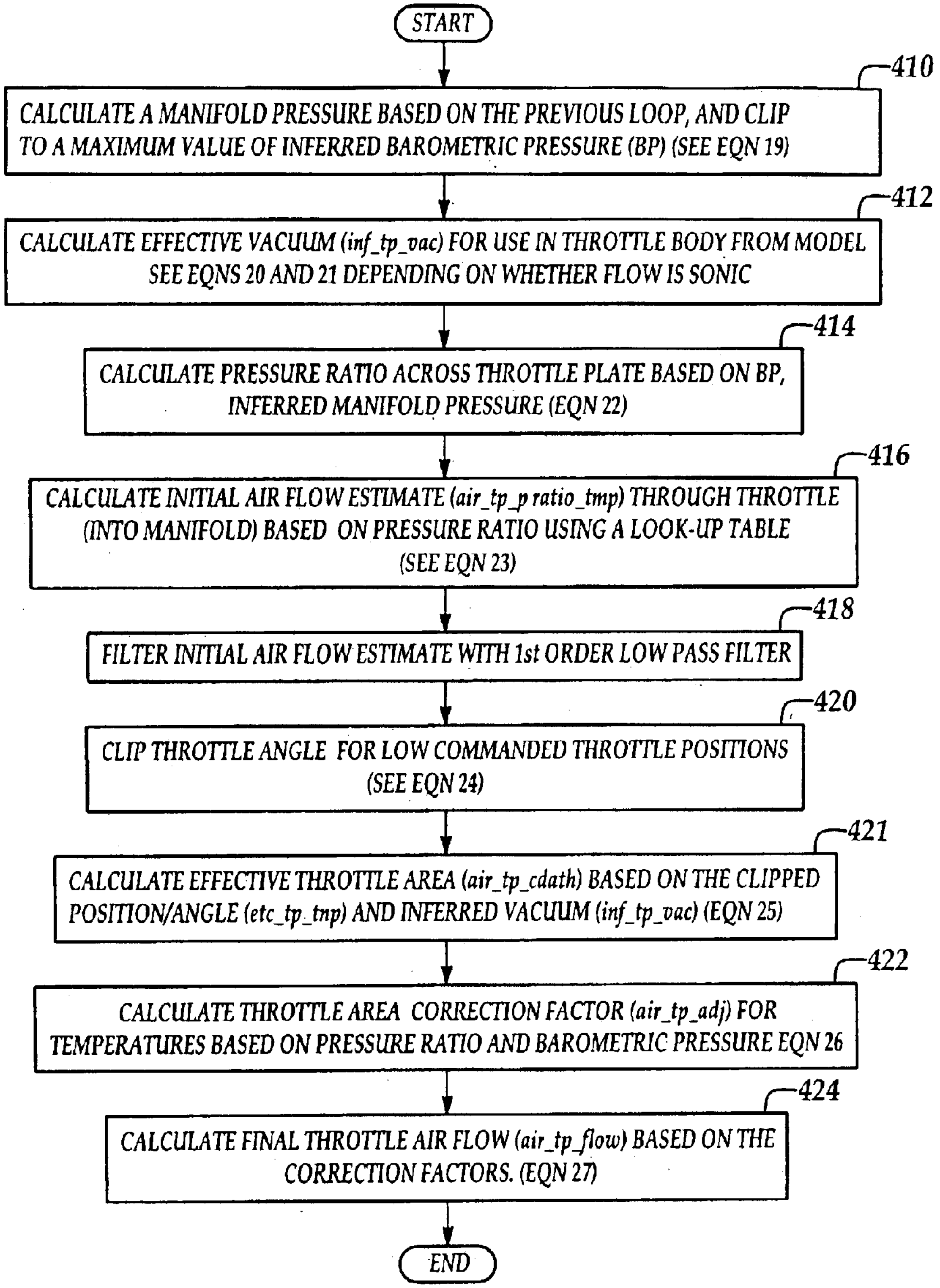

Referring now to FIG. 4, the following calculations are performed at a 0.016 second rate. In general the routine is performing calculations to determine throttle body airflow. First, in step 410, the routine calculates a manifold pressure based on the previous loop, and clips this to a maximum value of inferred barometric pressure (bp).

In other words, the routine first calculates a manifold pressure from the value on the previous loop, clipped to a maximum value of inferred barometric pressure minus a small calibratable delta AIR__TPDELBP, e.g., 0.3 In.Hg. as shown in equation 19.

inf__tp__map=MIN(inferred__map, bp−AIR__TPDELBP); EQN 19

In an alternative embodiment, the execution rate of the calculation could be increased in order to avoid clipping the inferred manifold pressure to the value (bp−AIRTPDELBP). For economy of chronometrics; the clipping method has been selected. Note that this throttle-based model is an iterative calculation that occurs at a task rate fast enough, when compared to how fast the airflow rate is changing, to allow convergence to a solution. There is one region where a modification to the calculation was used to improve performance. In particular, as manifold pressure gets closer to barometric pressure, the airflow rate decreases rapidly. Therefore, the routine does not let inf__tp__map take on values greater than (bp−airtpdelbp). However, another solution is to simply increase the task rate of the calculation.

Continuing with FIG. 4, next, in step 412, the routine calculates the effective vacuum for use in the throttle body model. A different transformation is used according to whether the flow is choked or "sonic" flow in the fluid dynamic sense as shown in equations 20 and 21 below and the corresponding if/else logic.

If (inf__tp__map<=(bp*5282818E−07)) [i.e., choked flow], then:

inf__tp__vac=(1.0−5282818E−07)*bp; EQN 20

Otherwise (else), inf__tp__vac=bp−inf__tp__map; EQN 21

Next, in step 414, the routine calculates a pressure ratio for use in the throttle body model as shown in equation 22.

pra__temp=bp/inf__tp__map; EQN 22

Then, in step 416, the routine calculates an initial airflow estimate (air__tp__pratio__tmp) through the throttle (into the mainfold) based on pressure ratio using a look up table as shown in equation 23. The table stored data on flow as a function of throttle position (TP) and vacuum.

air_tp_pratio_tmp=lookup(FNETC_PR, pra_temp); EQN 23

Next, in step 418, the routine, the routine filters the initial airflow estimate (filtered pressure ratio across throttle) with a first order (low pass) filter. This creates improved convergence in the logic, wherein map=f(airflow) and airflow=f (map). The pressure ratio is filtered using a calibratable filter constant AIR_TP_PR_FK, giving parameter air_tp_pratio.

During low throttle angles, a small difference between commanded and measured throttle angle translates to a large percent difference in desired load compared to load_fg_tp. For example, if commanded angle is 0.3 and measured angle is 0.15, one could have a 50% load error. Therefore, the routine uses the maximum of the desired throttle position, etc_des_ta, and the observed value etc_tp_arb for tp airflow estimate to avoid the throttle reading low, as shown in step 420 and equation 24.

etc_tp_tmp=MAX(etc_des_ta, etc_tp_arb); EQN 24

Next, in step 421, the routine calculated the effective throttle area (air_tp_cdath) based on the clipped position/angle and inferred vacuum in equation 25.

air_tp_cdath=lookup(FNET_CD70, etc_tp_tmp, inf_tp_vac); EQN 25

Then, in step 422, the routine calculates a throttle body correction factor for act and bp as shown in equation 26.

air_tp_adj=bp*air_tp_pratio/SQRT(act+460); EQN 26

In step 424, the routine finally calculates the adjusted throttle body airflow (in 1 bm/min) as shown in equation 27.

air_tp_flow=air_tp_adj*air_tp_cdath; EQN 27

Figure 5:
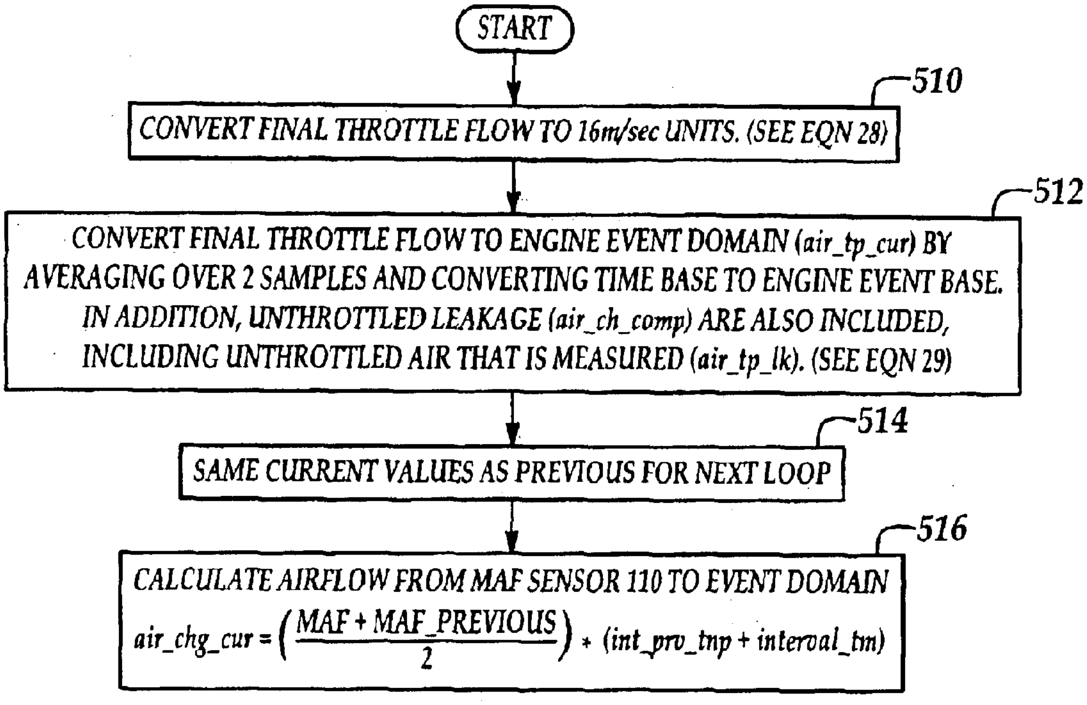

Referring now to FIG. 5, the following calculations are performed at PIP rate (i.e., synchronously with engine firing).

First, the routine converts the final throttle flow into pounds-mass per second units as shown in equation 28 below.

tp_current=air_tp_flow/60; [modeled air mass flow, 1 bm/sec]

Next, the routine calculate air charge from throttle body model as shown. The routine converts the final throttle flow into engine even domain units (air_tp_cur) by averaging the sampled values over 2 sample events and converting the time based to engine event base. In addition, unthrottled leakage (air_chg_comp) is also included. Further, unthrottled air that is measured is also factored in (air_tp_lk) as shown in equation 29 below.

In other words, ((tp_prev+tp_current)/2)*(intprv_tmp+interval_tm) is the average of the last two samples. The quantity (air_tp_lk/60)*(intprv_tmp+interval_tm) is the metered unthrottled air converted to 1 bm/intake. The quantity air_chg_comp is compensation for unmetered, unthrottled leakages.

air_tp_cur=((tp_prev+tp_current)/2+air_tp_lk/60)*(intprv_tmp+interval_tm)+air_chg_comp; EQN 29, where intprv_tmp is the previous sample time and interval_tm is the current sample time.

Next, in step 514, the routine saves the current values as the previous values for the next loop.

Then, in step 516, the routine calculates the airflow from the mass air flow sensor 110 in the event domain as shown. This value can then be used with the manifold filling model described below herein with regard to FIG. 6 to estimate cylinder charge for the current event, as well as to predict cylinder charge several (e.g., 2) events in the future for fuel calculation.

Figure 6:
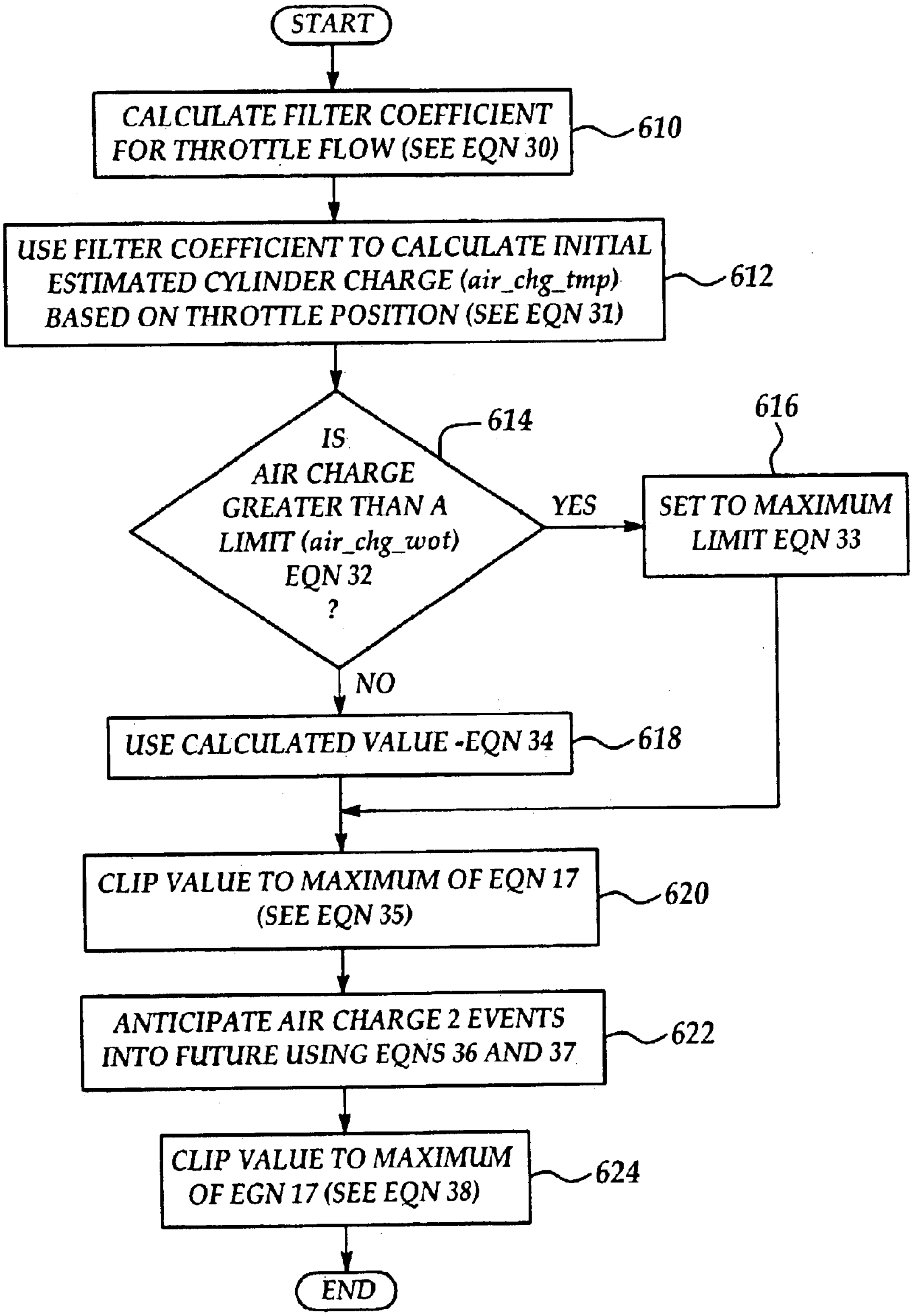

Referring now to FIG. 6, the routine describes a manifold filling model. Note that this particular example shows utilizing the model with airflow predicted from a throttle body model. However, the same model is also used with the throttle flow determined from the mass air flow sensor in step 516. The equations below show such dual use for the manifold filling model.

First, in step 610, the routine calculates the manifold filling model filter coefficient (air_k). In particular, the routine calculates the manifold filling model filter coefficient for the throttle flow (air_k_tp) as shown in equation 30.

tp_k_denom_tmp=map_regr_slope[1]+(map_regr_intercept[2]/air_tp_chg)+map_regr_quad_term[3]*(air_tp_chg−maxairchg+(maxairchg*maxairchg/(6.0*air_tp_chg)));

air_k_tp=(air_num_mult[4]/tp_k_denom_tmp); EQN30

[1]See equation 4.
[2]See equation 1.
[3]See equation 11.
[4]See equation 13.

If using the air meter, the value air_chg would replace air_tp_chg.

Next, in step 612 the filter coefficient is used to calculate an initial estimated in cylinder charge (air_chg_tmp) based on the throttle position as shown in equation 31.

air_chg_tmp=((air_k_tp/air_k_tplst[5])*(1−air_k_tp)*air_tp_chg)+(air_k_tp*air_tp_cur); EQN 31

[5] Previous air_k_tp from last PIP event.

This constitutes one embodiment of the manifold filling model. When the air meter airflow is used with this model, the result using air_chg_cur produces the value air_chg using the filter coefficient that would be calculated with the mass air flow data described above. See FIG. 7 below.

Additional compensation can be optionally added to take into account the delays in the sensor reading.

Further, additional limits can be placed on the estimate, and prediction, or anticipation, can be added to obtain cylinder charge estimate at future events. These optional features are described below with regard to steps 614 to 624 and equations 32–35.

In particular, in step 614, the routine determines whether air charge is greater than a limit as shown in equation 32.

Is (air_chg_tmp>air_chg_wot)? EQN 32

If so, air_tp_chg_tmp is set to air_chg_wot (air_tp_chg_tmp=air_chg_wot; EQN 33) in step 616 to clip the calculated result to a maximum of AIR_CHG_WOT. Otherwise, air_tp_chg_tmp is set to air_chg_tmp to use the value as calculated as shown in equation 34 (air_tp_chg_tmp=air_chg_tmp; EQN 34).

From step 618, the routine proceeds to step 620. In step 620, the routine clips the value to the maximum of EQN 17 as shown in EQN 35 below.

$$air\_tp\_chg=f32min(air\_tp\_chg\_tmp,\ air\_chgwottp); \qquad \text{EQN 35}$$

The routine then anticipates the air charge 2 events into the future (step 622) using equations 36 and 37 as shown below.

In particular, the routine calculates the intermediate value of air that is anticipated to be in the throttle body as:

$$air\_tp\_mtr=air\_tp\_cur+air\_tp\_cur-air\_tp\_prv; \qquad \text{EQN 36}$$

Then, the routine calculates the anticipated air charge for 2 events in the future as:

$$air\_tp\_fil=((1-air\_k\_tp)*(1-air\_k\_tp)*air\_chg\_tmp)+((2-air\_k\_tp)*air\_k\_tp*air\_tp\_mtr); \qquad \text{EQN 37}$$

Finally, the routine clips the value the maximum of equation 27 as shown in equation 38.

$$cyl\_air\_tp=min(air\_tp\_fil,\ air\_chgwottp); \qquad \text{EQN 38}$$

Figure 7:
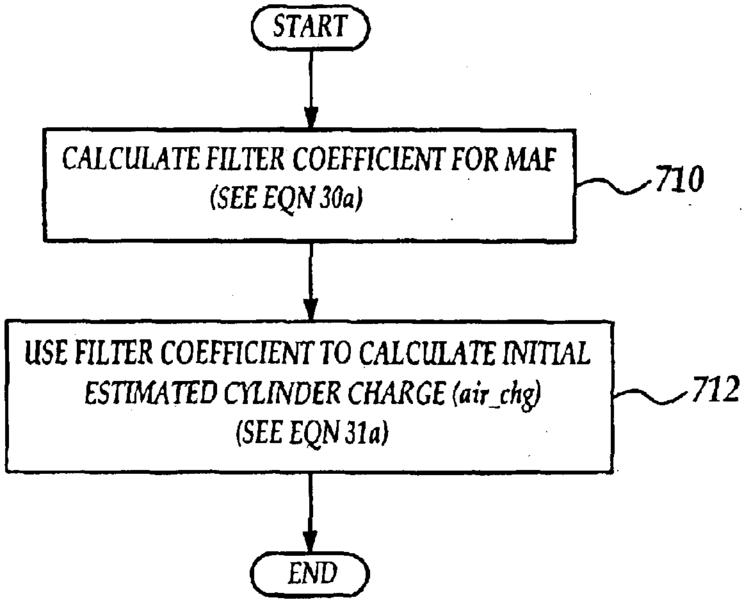

Referring now to FIG. 7, a routine performed at PIP events is described that implements the manifold filling model for the mass air flow sensor data.

First, in step 710, the routine calculates the manifold filling model filter coefficient (air_k). In particular, the routine calculates the manifold filling model filter coefficient for the mass air flow (air_fk) as shown in equation 30a.

$$air\_k\_denom\_tmp=map\_regr\_slope[6]+(map\_regr\_intercept[7]/air\_chg)+map\_regr\_quad\_term[8]*(air\_chg-maxairchg+(maxairchg*maxairchg/(6.0*air\_chg)));$$

$$air\_fk=(air\_num\_mult[9]/air\_k\_denom\_tmp); \qquad \text{EQN 30a}$$

[6]See equation 4.
[7]See equation 1.
[8]See equation 11.
[9]See equation 13.

Next, in step 712, the filter coefficient is used to calculate an initial estimated in cylinder charge (air_chg) based on the throttle position as shown in equation 31.

$$air\_chg=((air\_fk/air\_fk\_1st[10])*(1-air\_fk)*air\_chg\_prev)+(air\_fk*air\_chg\_cur); \qquad \text{EQN 31a}$$

[10]Previous air_fk from PIP event.

Figure 8:
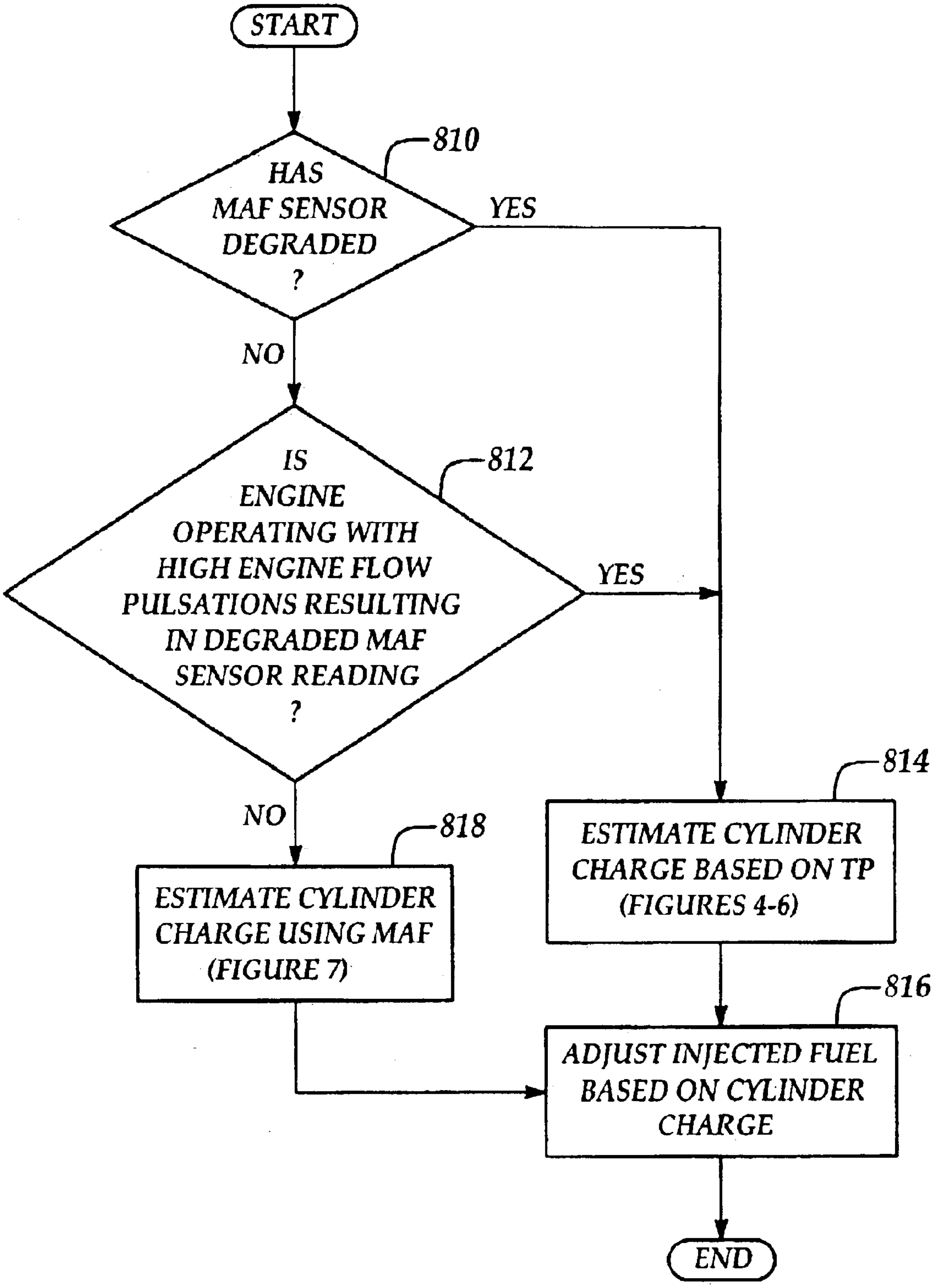

FIG. 8 describes an example routine for utilizing different embodiments during differing operating conditions. IN particular, in step 810, the routine determines whether the mass air flow sensor 110 has degraded. This can be accomplished by monitoring the connections of the sensor, or by estimating a proper reading range based on other operating conditions, such as based on manifold pressure, and/or throttle position.

If the answer to step 810 is YES, the routine continues to step 814 described below. Otherwise, the routine continues to step 812 to determine whether the engine is operating in a region with high engine flow pulsations. These high pulsations can result in a degraded measurement of flow from the mass air flow sensor 110, especially during high load or with open throttle conditions, even when the sensor is operating properly. As such, when the answer to step 812 is YES, the routine continues to step 814 to estimate cylinder charge using the throttle position as described in FIGS. 4–6. As such, when the mass air flow sensor provided degraded data, an alternative approach can be used to retain close control of engine air-fuel ratio and tailpipe emissions.

From step 814, the routine continues to step 816 to adjust injected fuel based on the determined cylinder charge.

If the answer to step 812 is NO, the routine continues to step 818 to estimate cylinder charge from the mass air flow sensor as shown in FIG. 7.

Note that throughout the specification, air and EGR masses are in lb, pressures are in inches Hg, engine speed is in RPM, volumes are in liters, and temperatures are in degrees R.

This concludes the detailed description of the invention.

We claim:

1. A method for estimating air entering an internal combustion engine having an intake manifold, comprising:

determining a first estimate of air entering the manifold of the engine based on throttle position;

determining a second estimate of air entering the manifold of the engine based on a sensor coupled to the engine;

processing said first estimate through a manifold filling model to produce a first estimate of air entering a cylinder of the engine;

processing said second estimate through said manifold filling model to produce a second estimate of air entering a cylinder of the engine; and adjusting an engine operating parameter based on at least one of said first and second estimates, wherein said engine operation parameter is adjusted based on said first estimate during a first set of conditions and adjusted based on said second estimate during a second set of conditions.

2. The method recited in claim 1 wherein said first set of conditions include wide open throttle conditions.

3. The method recited in claim 1 wherein said first set of conditions include large engine air pulsations.

4. The method recited in claim 1 wherein said first set of conditions include when said sensor coupled to the engine has degraded.

5. The method recited in claim 1 wherein said determining said first estimate of air entering the manifold of the engine based on throttle position further includes adjusting said first estimate based on an amount of EGR.

6. The method recited in claim 1 wherein said determining said first estimate of air entering the manifold of the engine based on throttle position further includes adjusting said first estimate based on environmental conditions.

7. The method recited in claim 6 wherein said environmental conditions include barometric pressure.

8. The method recited in claim 7 wherein said environmental conditions include air temperature.

9. A method for estimating air entering an internal combustion engine having an intake manifold, comprising:

determining a first estimate of air entering the manifold of the engine based on throttle position;

determining a second estimate of air entering the manifold of the engine based on a sensor coupled to the engine;

processing said first estimate through a manifold filling model to produce a first estimate of air entering a cylinder of the engine;

processing said second estimate through said manifold filling model to produce a second estimate of air entering a cylinder of the engine; and adjusting an amount of injected fuel into the engine based on at least one of said first and second estimates depending on engine operating conditions, wherein said amount of injected fuel is adjusted based on said first estimate during a first set of conditions and adjusted based on said second estimate during a second set of conditions.

* * * * *